United States Patent [19]
Arjomand et al.

[11] Patent Number: 5,916,287
[45] Date of Patent: Jun. 29, 1999

[54] MODULAR AUTOMOTIVE DIAGNOSTIC, TEST AND INFORMATION SYSTEM

[75] Inventors: Hossein Arjomand, Cupertino; Ralph W. Conway, Saratoga; Michael C. McCullough, San Jose, all of Calif.

[73] Assignee: Hewlett-Packard Company, Palo Alto, Calif.

[21] Appl. No.: 08/720,390

[22] Filed: Sep. 30, 1996

[51] Int. Cl.⁶ ................................................. G01M 17/00
[52] U.S. Cl. ............................. 701/29; 701/33; 73/117.2
[58] Field of Search .................................. 701/29, 33, 35; 73/117.2, 117.3

[56] References Cited

U.S. PATENT DOCUMENTS

| | | | |
|---|---|---|---|
| 4,113,980 | 9/1978 | Bell | 174/52 R |
| 4,694,408 | 9/1987 | Zaleski | 364/551 |
| 4,962,456 | 10/1990 | Abe et al. | 364/431.01 |
| 4,975,847 | 12/1990 | Abe et al. | 364/424.03 |
| 5,318,449 | 6/1994 | Schoell et al. | 434/305 |
| 5,347,425 | 9/1994 | Herron et al. | 361/683 |
| 5,526,493 | 6/1996 | Shu | 395/281 |
| 5,541,840 | 7/1996 | Gurne et al. | 364/424.03 |
| 5,555,498 | 9/1996 | Berra et al. | 364/424.03 |
| 5,675,139 | 10/1997 | Fama | 235/472 |
| 5,717,595 | 2/1998 | Cherrington et al. | 364/464.1 |
| 5,758,300 | 5/1998 | Abe | 701/33 |

OTHER PUBLICATIONS

Bloks, H. J., "The IEEE–1394 High Speed Serial Bus", Philips Journal of Research, vol. 50, No. 1, 1996, pp. 209–216.

*Primary Examiner*—Michael Zanelli
*Attorney, Agent, or Firm*—Denise A. Lee

[57] ABSTRACT

The present invention provides an inexpensive, automobile test diagnostic system which is capable of processing data from multiple high speed data channels. The vehicle test diagnostic system include an integrated computer for providing access to a technical database comprised of stored information records, with migration capacity between related records, and further to provide selective access to particular portions of information within the database, the integrated computer including a user interface responsive to operation by a user to provide commands, and a microprocessor responsive to commands entered through the user interface to access the information; and at least one instrumentation module electrically coupled to the integrated computer, the instrumentation module being responsive to commands entered through the user interface.

12 Claims, 6 Drawing Sheets

MODULAR AUTOMOTIVE DIAGNOSTIC, TEST AND INFORMATION SYSTEM

BACKGROUND OF THE INVENTION

The present invention relates in general to test equipment and, more particularly, to diagnostic, test and information systems.

Today, there are various hand held testers used in connection with the maintenance and repair of motor vehicles. Typically, these testers comprise cables attached to a microprocessor based device. The cables, for example, include a cable that connects to the motor vehicle battery and another cable that connects to an electrical system or component of the motor vehicle to measure voltage and current, as well as a data cable that connects to the engine control module to transmit information about operation of the vehicle to the hand held tester or to enable the tester to control various motor vehicle functions. See, for example, Tech 1, "Cartridges and Accessories," September, 1989.

Unfortunately, the cables connected to the motor vehicle are typically heavy and stiff. Consequently, the hand held tester is unweildly to operate, which is inconvenient to the user. Furthermore, the display screen on the hand held tester is small, and therefore, only a minimal amount of information can be displayed to the user.

Regarding the display of information to the user, the trend in the motor vehicle service bay is toward greater access to information relating to maintenance and repair. This trend requires the user to have a larger display screen incorporated into his or her test equipment and many connections to the motor vehicle, as well as to a dealership local area network (LAN).

Historically, motor vehicle manufacturers have provided printed information regarding maintenance and repair. As a service to motor vehicle maintenance and repair personnel, the manufacturers provided published information, such as manuals, for reference during maintenance and repair of motor vehicles. However, published information requires a large amount of storage space. More recently, motor vehicle manufacturers have provided maintenance and repair information on microfiche which is periodically updated. Although microfiche reduces storage requirements, microfiche can be misfiled and microfiche readers are cumbersome to use.

Today, various computer-based systems exist for providing motor vehicle maintenance and repair information. Some of these computer-based systems also comprise instruments to perform measurements in connection with motor vehicle evaluation and diagnosis. For example, one such computer-based system is the Model HP27070B ("TestBook"), available from Hewlett-Packard Company, Palo Alto, Calif. See, "HP TestBook," Hewlett-Packard Company Part No. 5091-9697E, September, 1993.

The TestBook system is a portable integrated personal computer and test system that provides compact mobile test and information tool for use in the motor vehicle service bay or on a road test. The TestBook system comprises a 486-microprocessor-based person computer, an integrated adjustable VGA liquid crystal display (LCD) panel and touchscreen interactive user interface having a capacitative touch-activated screen, and a built-in CD-ROM drive to provide faster and easier access to the latest service procedures and information for maintenance and repair of a motor vehicle. Built-in measure instrumentation and a programmable communications interface offer a test capability for computer-aided diagnostic applications. The TestBook system can be custom-configured to meet various MS-DOS, Windows, or OS/2 application requirements.

While the TestBook system provides ready access to a large amount of information needed for maintenance and repair of a motor vehicle, cables that connect to the vehicle must be attached to the measurement instrumentation integrated into the system. Consequently, as in the case of hand held testers, the TestBook system is unwieldy and is typically set on a work surface, such as a workbench or tool chest, during use. Therefore, the user does not have ready access to the integrated interactive display of the TestBook system while he or she is under the hood of the motor vehicle.

Additionally, a test and information tool for maintenance and repair of a motor vehicle which, has a selectively detachable, remotely operated interactive display unit that controls a portable integrated personal computer and test system is disclosed in co-pending U.S. patent application Series Code/Ser. No. 08/421,591, filed on Apr. 5, 1995 and assigned to the same assignee as the present application. This motor vehicle test and information tool provides greater user mobility than the TestBook system, because the display unit is not encumbered by being integrated with the personal computer having the additional weight of measurement instrumentation tethered by cables connected to electrical systems and components, as well as the engine control module, of the motor vehicle.

However, the measurement instrumentation is integrated with the personal computer, which requires a specially designed housing to accommodate both the personal computer and measurement instrumentation. The integrated personal computer and measurement instrumentation must also meet environmental and safety requirements relating to test equipment used in a motor vehicle service bay.

A modular wireless diagnostic, test and information system comprising a combined user interface and main control module and at least one remotely controlled instrumentation module connected by wireless communication is disclosed in co-pending U.S. patent application Series Code/Ser. No. 08/504,935, filed on Jul. 20, 1995 and assigned to the same assignee as the present application. The combined user interface with main control module has an interactive display which enables the user to command the functions of the remotely deployed instrumentation module(s) and enter data through interaction with the display, as well as execute application programs and displays information to the user. For example, one embodiment of the invention provides a combined user interface and main control module while having an interactive display, in which the user interacts with the display to access complex technical information employed to maintain and repair a motor vehicle and to control the instrumentation module(s) over a wireless communication link in the form of a radio-frequency (RF) local area network (LAN) to perform measurements on the vehicle, as well as to execute diagnostic routines and to display information to the user.

Although wireless system facilitate movement and positioning of the vehicle instrumentation modules and user interface, the wireless LAN circuitry and hardware components required to implement the wireless test diagnostic system are expensive. However, this increase in cost does not come with an increase in system performance. A disadvantage of wireless test diagnostic system is that the data being transferred from the instrumentation modules to the master control module has a slow data transfer rate. For example, typical data transfer rates for a wireless system would be 2 MB/sec. While this data transfer rate is sufficient for instrumentation channels having a slow data transfer rate, this data transfer rate may be insufficient for multiple vehicle instrumentation modules which have high speed data channels.

In addition, wireless communications systems are less reliable than traditional test diagnostic systems. Dependent on the system configuration, applications programs will often run on the server sending data to the user interface via the wireless LAN circuitry. This is problematic if the network goes down since failure of the network results in the wireless test diagnostic system being unable to communicate with the server. Further, because the applications programs are stored on the server, network failure would prevent the technician from operating the wireless test diagnostic system locally. In addition, wireless systems are more prone to failure due to their increased susceptibility to radio noise. Unfortunately, this problem is likely to increase due to the increased utilization of carrier frequency bands with wireless appliances such as cellular phone, etc.

An inexpensive, reliable, automobile test diagnostic system which can process information from high speed instrumentation data channels is needed.

SUMMARY OF THE INVENTION

The present invention provides an inexpensive, automobile test diagnostic system which is capable of processing data from multiple high speed data channels. The vehicle test diagnostic system according to the present invention is comprised of: an integrated control means for providing access to a technical database comprised of stored information records, with migration capacity between related records, and further to provide selective access to particular portions of information within the database, the integrated control means including a user interface responsive to operation by a user to provide commands, and a processing means responsive to commands entered through the user interface to access the information; and at least one instrumentation module electrically coupled to the integrated control means, the instrumentation module being responsive to commands entered through the user interface.

In the preferred embodiment, the at least one instrumentation module is electrically coupled to the integrated control module via a cable, preferably an IEEE P1394 cable. Use of an IEEE P1394 cable to electrically connect the instrumentation module to the integrated control means results in improved performance and reliability. Data transfer rates across an IEEE P1394 cable is at 400 M/sec compared to 2 MB/sec for a wireless system. This additional data bandwidth provided by a cable based system can be critical when implementing vehicle instrumentation modules which have high speed data channels.

Further, the test diagnostic system according to the present invention offers increased reliability. Because the applications are run on the processing means of the integrated control means, the test diagnostic system is not subject to failures resulting from the failure of the network. Similarly, the use of a cable implementation as opposed to a wireless implementation decreases system susceptibility to noise.

A further advantage of the proposed test diagnostic system is that it facilitates placement of the movement and positioning of the vehicle instrumentation modules by the technician during testing. The HP Testbook Test diagnostic system integrates the measurement instrumentation with the computer, display, etc. making the Testbook unwieldy to position during testing. The test diagnostic system according to the present invention physically separates the vehicle instrumentation module from the integrated control means allowing the vehicle instrumentation module to be placed in close proximity to the vehicle component under test.

In addition, the proposed test diagnostic system is easily updated or modified based on a change in test diagnostic system requirements. For example, a technician moving from testing a first car model to a second car model, may require additional information with respect to testing of the second car model. In the proposed test diagnostic system, transfer of the requested information may be easily achieved by transferring information from a technical database memory storage means to the memory of the integrated control means. This data transfer occurs by electrically coupling the technical database memory storage means to the integrated controller memory means, typically by using a docking station.

A further understanding of the nature and advantages of the present invention may be realized with reference to the remaining portions of the specification and the attached drawings.

DETAILED DESCRIPTION OF THE PREFERRED EMBODIMENTS

Figure 1:
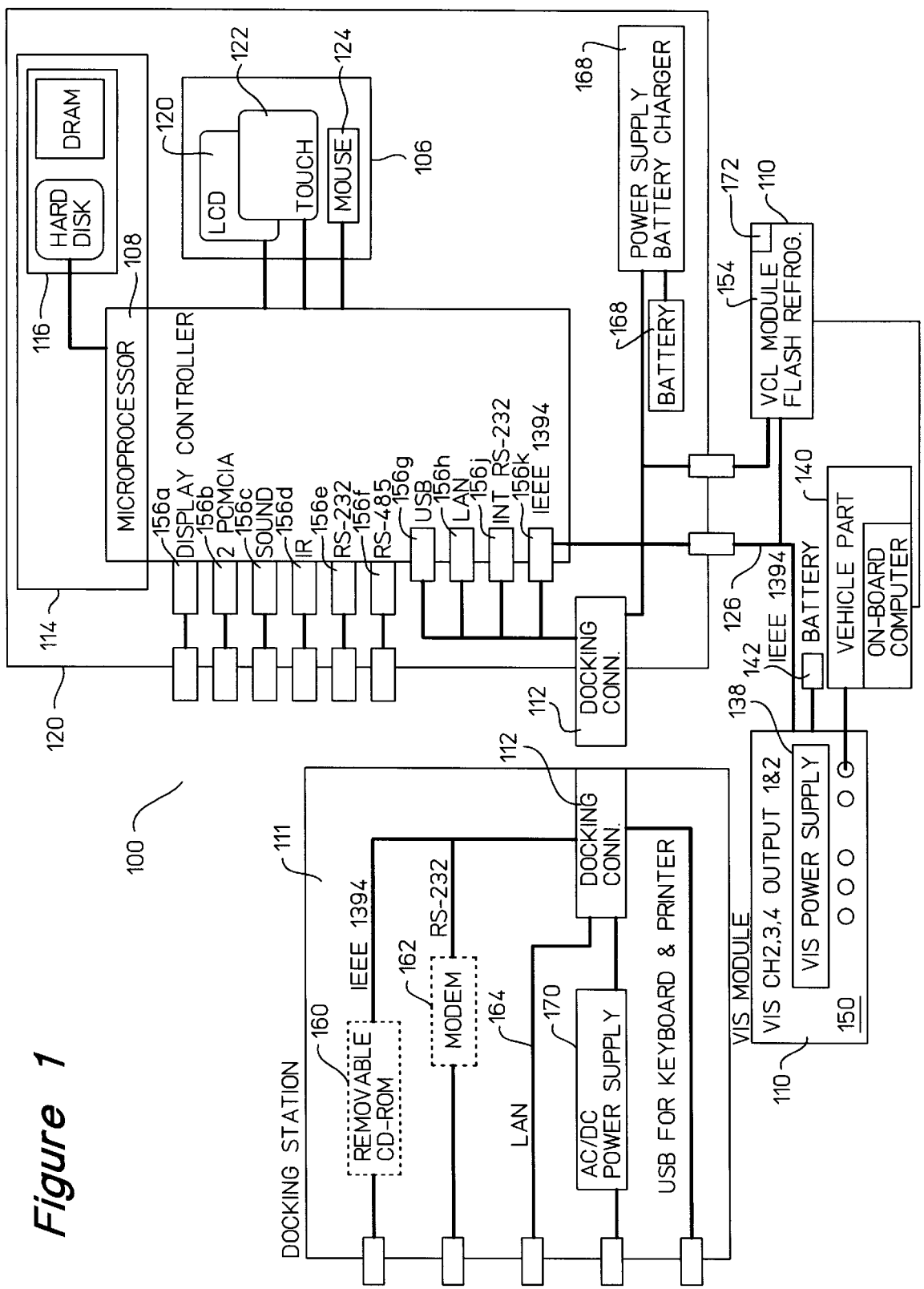
FIG. 1 is a block diagram of an implementation of the vehicle diagnostic test system according to the present invention.

FIG. 1 shows a vehicle diagnostic test system 100 according to the present invention. The vehicle diagnostic test system 100 includes: an integrated control means 102 for providing access to a technical database comprised of stored information records, with migration capacity between related records, and further to provide selective access to particular portions of information within the database, the integrated control means 102 including a user interface 106 responsive to operation by a user to provide commands, and a processing means 108 responsive to commands entered through the user interface 106 to access the information; and at least one instrumentation module 110 electrically coupled to the integrated control means 102, the instrumentation module 110 being responsive to commands entered through the user interface 106. In the preferred embodiment, the integrated control means 102 is electrically coupled to a docking station 111, the docking station 111 including a docking connector means 112 for electrically coupling the integrated control means 102 to the docking station 111.

In the test diagnostic system 100 shown in FIG. 1, the integrated control means 102 combines or integrates the user interface 106 with a computing means 114, which includes a processing means 108 and an integrated controller memory means 116 in a single, easy to carry structure. The processing means is typically a microprocessor such as the Pentium processor manufactured by Intel Corporation. Through the user interface 106, the integrated control means 102 provides the user with any or all visual, audible, and/or tactile means by which to communicate to the remainder of the system. Although the user interface 106 shown FIG. 1 includes only an LCD panel 120, a touch screen 122, and a mouse 124, other user interfaces may be used. Further, the integrated control means 102 provides information to and receives commands from the user to process or communicate to the instrumentation modules 110 via the corresponding instrumentation module bus 126.

In the preferred embodiment, the instrumentation module bus 126 for electrically coupling the vehicle instrumentation module 110 to the integrated control means 102 is an IEEE 1394 bus. Although the IEEE 1394 bus is a bus targeted for consumer products, the IEEE 1394 bus provides high throughput performance, low and predictable latency, true plug and play support and hot plug-in connectivity. The IEEE 1394 supports both synchronous and asynchronous data transmission at a throughput of up to 400 MB/sec. This high rate of data throughput is critical in systems having multiple vehicle instrumentation modules which have high speed data channels.

A further advantage of the test diagnostic system 100 is that it facilitates the placement and movement of the vehicle instrumentation modules by the technician during testing. Compared to cables used in previous test diagnostic systems, the cable which supports the IEEE 1394 bus is much thinner, providing easier movement for the technician. Separation of the functionality between the vehicle instrumentation module and the integrated control means by the IEEE 1394 bus allows the vehicle instrumentation module to be placed in close proximity to the component being tested. In addition, the physical separation of the vehicle instrumentation module and the integrated control means by a cable allows the vehicle instrumentation module to be more easily connected to the vehicle battery. Connecting the vehicle instrumentation module directly to the vehicle battery results in a smaller power supply for the integrated control means, a decreased power drain from the J1962 vehicle connector and a smaller, lighter and cooler integrated control means.

In the embodiment shown in FIG. 1, the bus to the removable CD ROM is an IEEE 1394 bus, the bus for the modem is a RS232 bus and the bus for the keyboard and printer is a USB bus. However, dependent on the requirements of the docking station, these buses and the components to which they are connected to may change. Although in the embodiment shown in FIG. 1 the IEEE 1394 bus is connected to a CD ROM, the type of device the IEEE 1394 bus is connected to may change. For example, the IEEE 1394 interface on the docking station could be used for other digital devices such as digital cameras, scanners and printers. These devices could be used for reporting of a mechanical defect, parts failure, capturing engine noise, documenting mechanical wear, or adding pictures to customer reports. Further, because of the plug and play support for the IEEE 1394 bus, a wider selection of peripheral is available for use in combination with the test diagnostic system 100.

Figure 2:
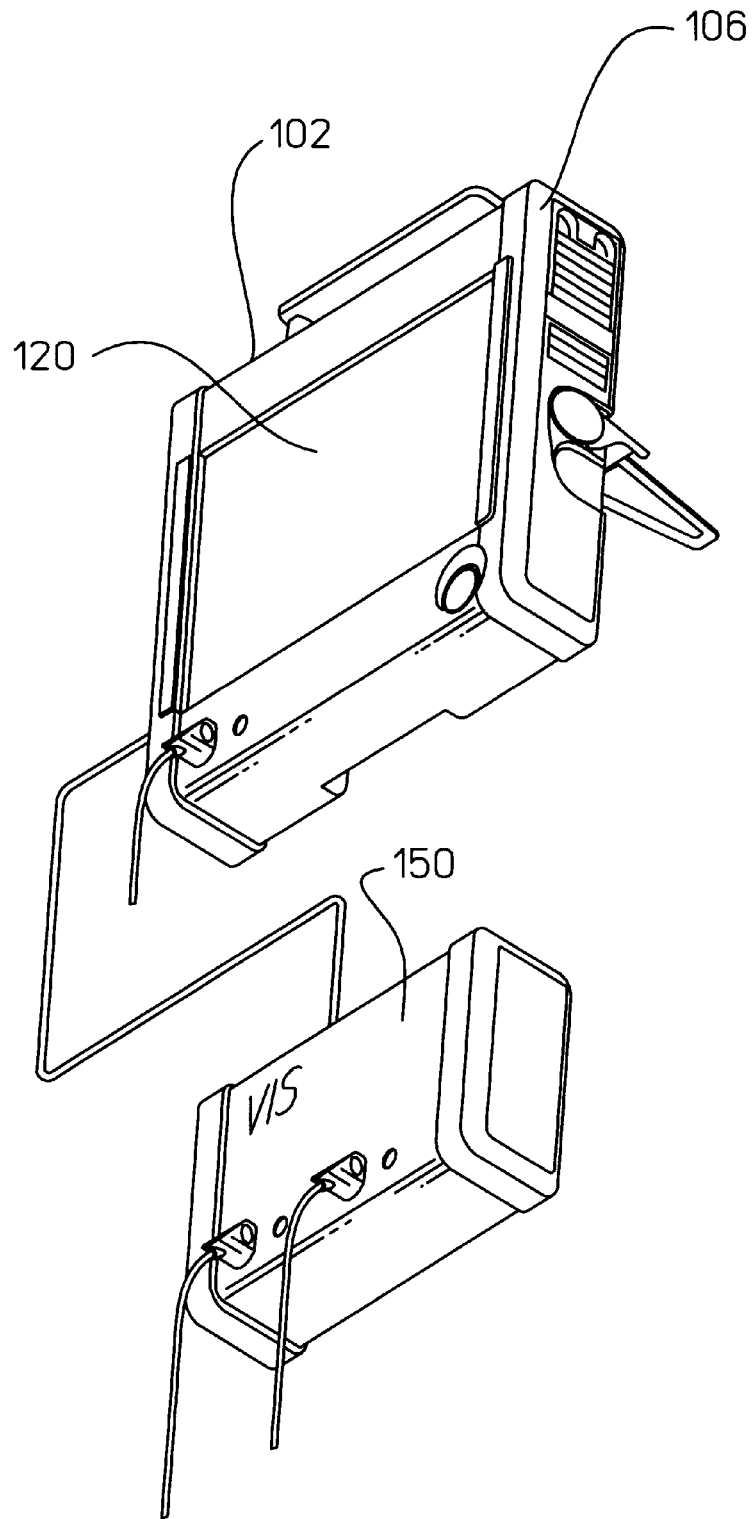
FIG. 2 shows an isometric view of a first embodiment of the vehicle diagnostic test system where the integrated control means is electrically coupled to a single instrumentation module.
Figure 3:
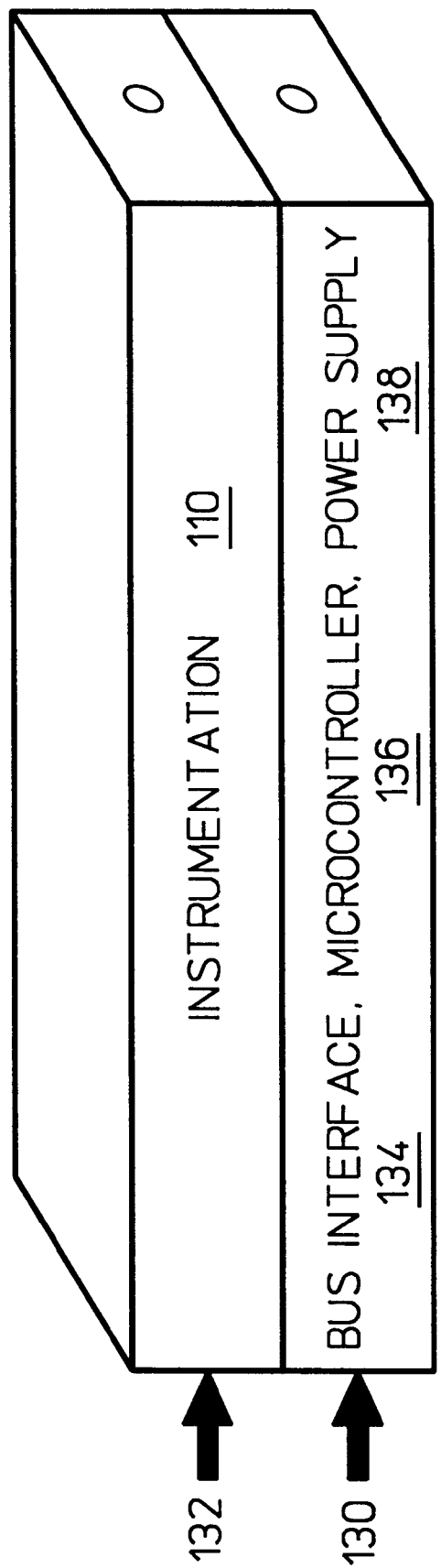
FIG. 3 is a block diagram of an instrumentation modules included in the system shown in FIG. 1.

The test diagnostic system comprises at least one instrumentation module for performing measurements. FIG. 2 shows an isometric view of a first embodiment of the vehicle diagnostic test system where the integrated control means 102 is electrically coupled to a single instrumentation module 110. FIG. 3 is a block diagram of an instrumentation module 110, such as may be included in the system shown in FIGS. 1 and 2. The instrumentation module 110 is comprised of a common layer 130 and a customized layer 132. The common layer 130 typically includes a bus interface 134, a dedicated microcontroller 136 and a power supply 138. The custom layer 130 is customized dependent on the function of the module. Examples of instrumentation modules typically found in automotive diagnostic test systems: include a vehicle communication interface (VCI), a digital volt-ohm meter (DVOM), and an engine analyzer I/F.

The instrumentation module 110 is connected to the vehicle part or system 140 to be tested and provides a bidirectional data path between the integrated control means 102 and the vehicle part being tested 140. Typically, the vehicle instrumentation module 110 will have an isolated analog/digital input stage to isolate the vehicle communication interface of the integrated controller memory means 116 from the electrical system of the motor vehicle. Each instrumentation module 110 further includes its own power supply 136. As shown in FIG. 1, the instrumentation module 110 may additionally be electrically coupled to the battery supply 142 of the motor vehicle under test.

The vehicle diagnostic test system is designed to be scaleable, allowing the customer to determine how many instrumentation modules (how much functionality) are needed for each system. For example, a customer may start with a base unit which includes an integrated control means 102 and a single instrumentation module 110. At a later date, further instrumentation modules 110 may be purchased.

Separating the vehicle instrumentation module from the integrated control means 102 allows the vehicle instrumentation module 110 to be placed directly in the engine compartment. Placing the vehicle instrumentation module directly in the engine compartment allows enhanced cable management since all cables and transducers will be connected directly to the vehicle instrumentation module 110 without weighing down the integrated control means 102. Furthermore, the cables and transducers have shorter lengths, hence making integrated control means 102 lighter to transport. Further, because the instrumentation modules 110 are separate from the integrated control means 102, the instrumentation modules 110 can be built to allow more ruggedness for the harsh environmental conditions (such as high temperature) in the proximity of the component of the vehicle being tested.

It is also realized that when there is a need to use the functionality supported by the vehicle instrumentation module 110, a transport device would most likely be used to carry the cables and transducers. Hence, carrying the vehicle instrumentation channel in the transport device would not hinder the technician's mobility. In addition, a more common configuration of the cables and transducers connected to the module could be left connected, only requiring connection to the vehicle, and a single quick connection to the integrated control means. The quick connect and disconnect of the vehicle instrumentation module from the integrated control means enables the technician to use the integrated control means on a second vehicle while the vehicle instrumentation modules is still connected to the first vehicle. The vehicle instrumentation module connected to the first vehicle may continue capturing data without being connected to the integrated control means (similar to a flight recorder). This allows for a quick disconnect of the integrated control means from the vehicle under test to be used on a different vehicle and reconnected back to the first vehicle perhaps with new data captured in the module which is ready to be transferred.

Figure 4:
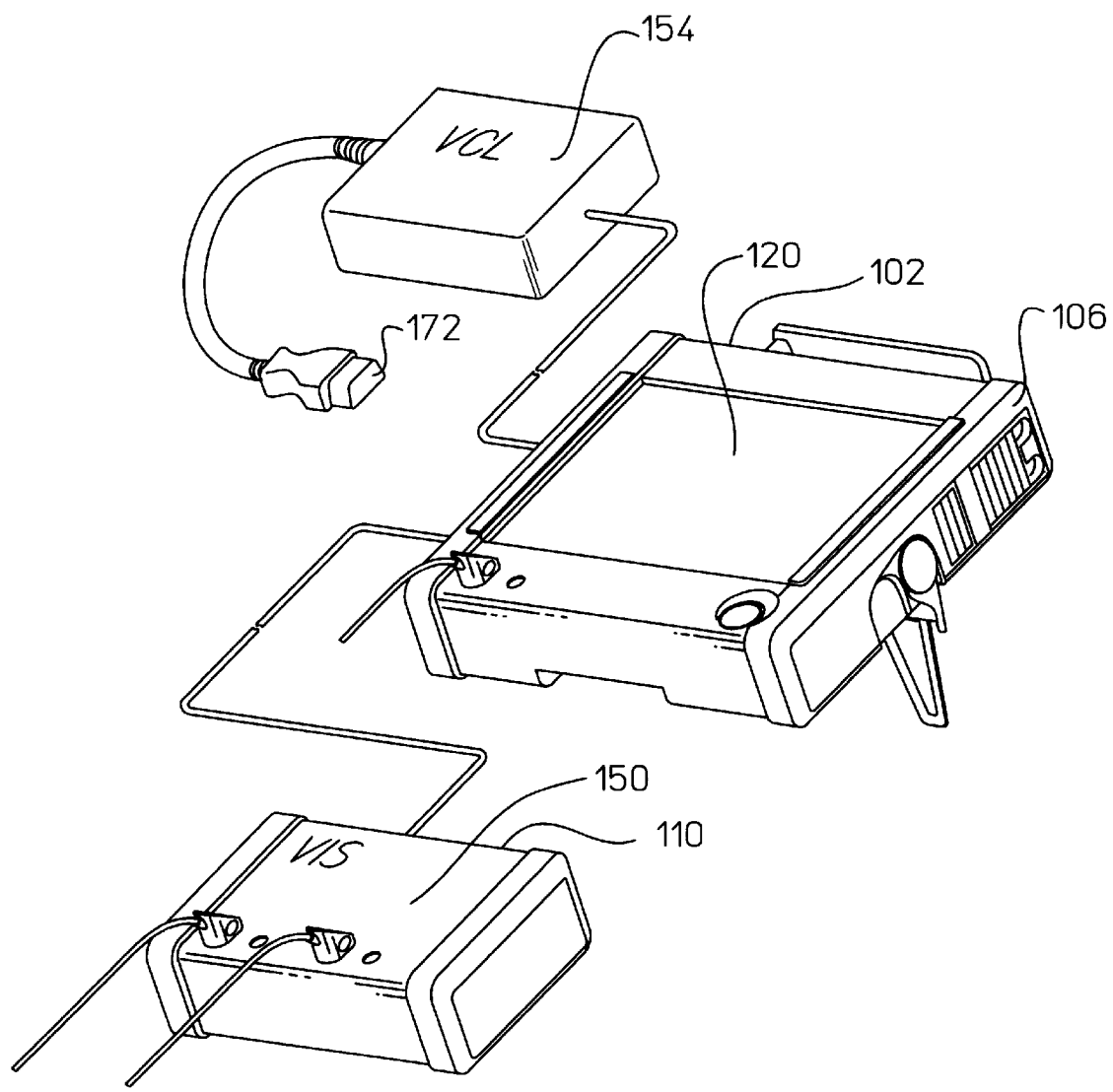
FIG. 4 shows an isometric view of an alternative embodiment of the vehicle diagnostic test system where the integrated control means is electrically coupled to a first and second instrumentation modules.

FIG. 4 shows an isometric view of an alternative embodiment of the vehicle diagnostic test system where the integrated control means 102 is electrically coupled to a first 150 and a second 154 instrumentation module. The VCL instrumentation module includes a microcontroller that is dedicated to communicating with the vehicle on-board computer. Although the VCL circuit module 154 could be incorporated into the integrated control means 102, in the preferred embodiment shown in FIG. 1, the VCL instrumentation module is moved outside the integrated control means. Typically, the configuration shown in FIG. 4 will result in a much thinner longer capable between the integrated control means 102 and the VCL instrumentation module 154 and a very short thicker cable positioned between the VCL instrumentation module 154 and the J1962 connector 172.

The VCL instrumentation module 154 takes its power from the J1962 connector 172 and passes the power lines to the integrated control means 102. Although the net power consumed in this configuration (shown in FIG. 4) is slightly higher, the heat generated by the VCL circuit is removed from the integrated control means.

Referring to FIG. 1, in addition to the computing means, instrumentation I/O card and user interface, the integrated control means includes a plurality of ports 156 for communication with peripherals. The ports shown in FIG. 1 include a port 156a for a display controller, a PCMCIA port 156b, a sound port 156c, an IR port 156d, an RS-232 port 156e, an RS-485 port 156f, a USB port 156g, a LAN port 156h, an Internal RS-233 port 156j, and an IEEE 1394 port 156k.

The software environment for the test system 100 is preferably a window-based software interface. The user operates the integrated control means 102 through the user interface 106 to control the diagnostic test system 100. The instrumentation module 110 is connected to a part or system to be tested. For example, the instrumentation module 110 may be connected to the electrical system of the vehicle. The integrated control means 110 executes diagnostic application programs and commands the instrumentation module 110 to provide status information and/or measurement data. The use interface displays 106 the requested information to the user.

Figure 5:
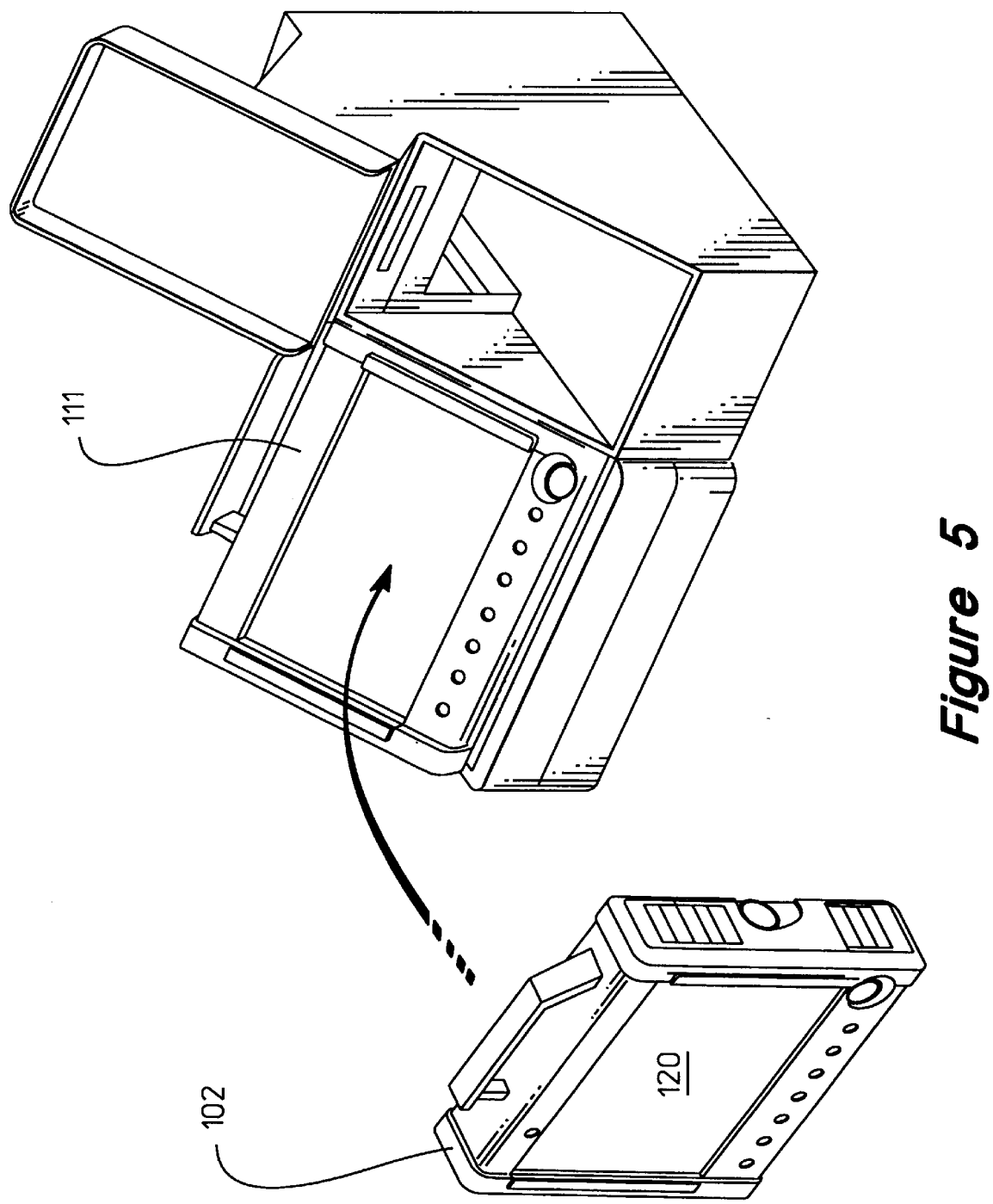
FIG. 5 shows an isometric view of the vehicle diagnostic test system according to the present invention where the docking station is mechanically and electrically coupled to the integrated control means.

Referring to FIG. 1 shows a docking station 111 which can be electrically coupled to the integrated control means 102. FIG. 5 shows an isometric view of the vehicle diagnostic test system 100 according to the present invention where the docking station 111 is mechanically and electrically coupled to the integrated control means 102. The docking station 111 provides access to other peripherals. For example, say the technician switches to test a vehicle whose test diagnostic data is not stored in the integrated control means 102. This will result in an error message, advising technician that the information required to complete his tests is not available. The additional data required to complete testing may be accessed through the docking station 111.

In the embodiment shown in FIG. 1, there are three ways to access additional test diagnostic data. Data may be accessed through the CD ROM 160 or by interfacing with a vehicle information database through the network via either the modem 162 or LAN connection 164. In the embodiment shown in FIG. 1, the docking station 111 provides the following interfaces: an IEEE interface to the CD ROM 160, a parallel interface to a printer or other peripheral, a modem interface, a LAN interface, and a USB interface.

In the proposed test diagnostic system, transfer of the requested information may be easily achieved by transferring information from a technical database memory storage means 166 to the memory of the integrated control means 102. In one embodiment, the CD ROM 160 is a storage means for the technical database memory storage means 166. To transfer vehicle data from the technical database memory storage means, the technical database memory storage means 166 must first be electrically coupled to the integrated controller memory means 116. A command from the user interface will initiate the data transfer.

Figure 6:
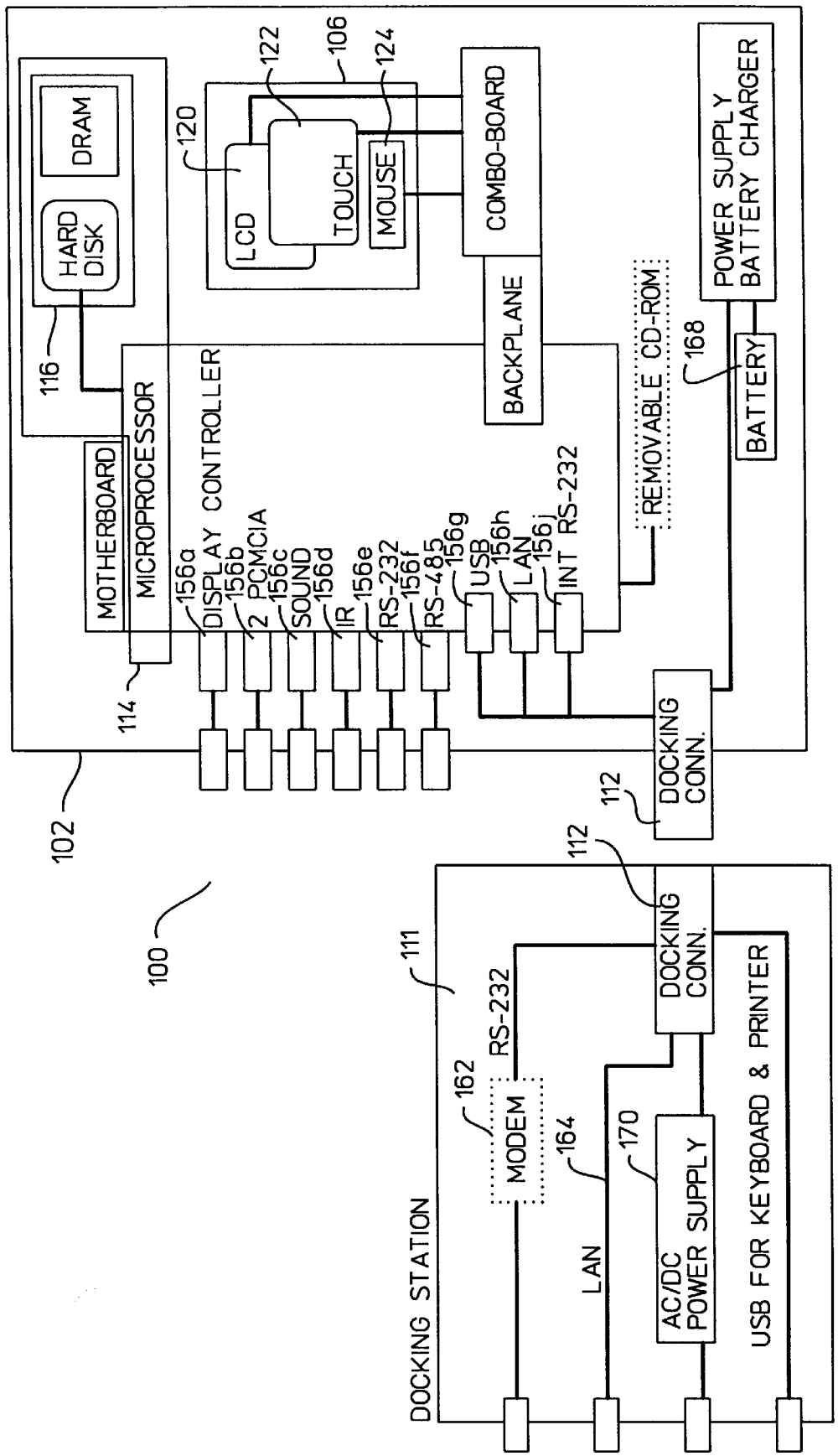
FIG. 6 shows a block diagram of an alternative embodiment of vehicle diagnostic test system where a removable CD ROM is included in the integrated control module.

In the preferred embodiment, the CD ROM 160 is removable and is physically located in the docking station 111. Making the CD ROM 160 removable, allows for easy system upgrades. In an alternative embodiment, the CD ROM 160 is physically located in the integrated control means 102. Referring to FIG. 6 shows a block diagram of an alternative embodiment of vehicle diagnostic test system 100 where a removable CD ROM 160 is included in the integrated control module 102. This configuration is not preferred, since it reduces the ruggedness of the vehicle diagnostic test system 100. However, placement of the CD ROM 160 in the integrated control means 102 is advantageous as it provides for access to the CD ROM 160 when the system is not electrically connected to the docking station 111 and thus provides an alternative booting device.

Power can be supplied to the integrated control means 102 from a rechargeable internal battery power source 168 or from an external power source 170 if the internal power supply develops a low battery condition. Power can be supplied or the internal battery power source 168 can be recharged via the docking station 111. In the embodiment shown in FIG. 1, the integrated control means 102 further includes a battery charging circuit. This minimizes the wiring in the docking connector, eliminating the battery status sensing wires. The charging circuit will be active only when the integrated control means is connected to the docking station or alternatively when the integrated control means powered from the J1962 and the J1962 is in its sleep mode. When connected to the docking station 111, only DC power is supplied to the integrated control means 102.

Although the modular wireless diagnostic, test and information system in accordance with the present invention is susceptible to being used in various applications, it has been found to be particularly advantageous for use in the maintenance and repair of motor vehicles. Therefore, an embodiment of the modular diagnostic, test and information system in accordance with the invention will be described in connection with service of a motor vehicle. However, it is to be understood that the invention is not limited to motor vehicle maintenance and repair and may also be applicable to non-motor vehicle applications.

It is understood that the above description is intended to be illustrative and not restrictive. The scope of the invention should therefore be determined with respect to the appended claims, along with the full scope of equivalents to which such claims are entitled.

What is claimed is:

1. A vehicle test diagnostic system to provide information to maintain and repair equipment or provide services, comprising:

an integrated control means for providing access to a technical database comprised of stored information records, with migration capacity between related records, and further to provide selective access to particular portions of information within the database, the integrated control means including a user interface responsive to operation by a user to provide commands, and a processing means responsive to commands entered through the user interface to access information;

at least one instrumentation module electrically coupled to the integrated control means and a system of the vehicle under test, the instrumentation module being responsive to commands entered through the user interface;

a vehicle communication link module electrically coupled to the integrated control means and an on-board computer of the system of the vehicle under test, wherein the vehicle communication link module is further coupled in parallel to the at least one instrumentation module.

2. The vehicle test diagnostic system recited in claim 1 wherein the means for electrically coupling the integrated control means to the at least one instrumentation module is a IEEE 1394 bus.

3. The vehicle test diagnostic system recited in claim 1 wherein the integrated control means further includes an integrated controller memory means, wherein the technical database is transferred to the integrated controller memory means from a technical database memory storage means, the data transfer occurring during a time period when the technical database storage means is electrically coupled to the integrated controller memory means.

4. The vehicle test diagnostic system recited in claim 3 wherein the technical database memory storage means is removable.

5. The vehicle test diagnostic system recited in claim 3 wherein the technical database memory storage means is a CD ROM.

6. The vehicle test diagnostic system recited in claim 1 wherein the integrated control means further includes an integrated controller memory means and further wherein an applications program for controlling the vehicle test diagnostic system is stored in the integrated controller memory means.

7. The vehicle test diagnostic system recited in claim 1 further comprising a docking station means electrically coupled to the integrated control means.

8. The vehicle test diagnostic system recited in claim 7 wherein the docking station means further includes a technical database memory storage means.

9. The vehicle test diagnostic system recited in claim 7 wherein the docking station means further includes a means for communicating with a means for storing test vehicle data.

10. The vehicle test diagnostic system recited in claim 7 wherein the docking station means further including a power supply means.

11. The vehicle diagnostic system recited in claim 1 wherein the at least one vehicle instrumentation module is electrically coupled to a battery of a vehicle currently under test.

12. The vehicle diagnostic system recited in claim 1 wherein the at least one vehicle instrumentation module includes a vehicle instrumentation power supply.

* * * * *